(12) United States Patent
Heisey (10) Patent No.: US 8,678,498 B2
(45) Date of Patent: Mar. 25, 2014

(54) CHILD RESTRAINT SYSTEM (75) Inventor: Nathan W. Heisey, Seymour, IN (US)

(73) Assignee: Cosco Management, Inc., Wilmington, DE (US)

( * ) Notice: Subject to any disclaimer, the term of this patent is extended or adjusted under 35 U.S.C. 154(b) by 415 days.

(21) Appl. No.: 13/154,182

(22) Filed: Jun. 6, 2011

(65) Prior Publication Data
US 2011/0298259 A1 Dec. 8, 2011

Related U.S. Application Data (60) Provisional application No. 61/352,519, filed on Jun. 8, 2010.

(51) Int. Cl.
B60N 2/28 (2006.01)
A47D 1/10 (2006.01)

(52) U.S. Cl.
USPC ................. 297/256.16; 297/130

(58) Field of Classification Search
USPC ......... 297/256.16, 250.1, 130, 253, 47.38, 30
See application file for complete search history.

(56) References Cited

U.S. PATENT DOCUMENTS

| 4,306,749 | A | * | 12/1981 | Deloustal ............... 297/256.16 |
| 4,750,783 | A | | 6/1988 | Irby et al. |
| 5,385,387 | A | | 1/1995 | Kain |
| 5,478,135 | A | | 12/1995 | Kain |
| 5,562,548 | A | * | 10/1996 | Pinch et al. ................ 472/119 |
| 5,586,351 | A | | 12/1996 | Ive |
| 5,997,098 | A | | 12/1999 | Coffeen |
| 6,017,088 | A | | 1/2000 | Stephens et al. |
| 6,170,911 | B1 | | 1/2001 | Kassai et al. |
| 6,299,249 | B1 | | 10/2001 | Mori |
| 6,331,032 | B1 | * | 12/2001 | Haut et al. ................ 297/130 |
| 6,336,682 | B1 | | 1/2002 | Rosko |
| 6,347,832 | B2 | | 2/2002 | Mori |
| 6,428,099 | B1 | | 8/2002 | Kain |
| 6,428,100 | B1 | | 8/2002 | Kain et al. |
| 6,443,522 | B1 | | 9/2002 | Kain et al. |
| 6,554,358 | B2 | | 4/2003 | Kain |
| 6,705,676 | B1 | * | 3/2004 | Berringer et al. ........ 297/256.16 |
| 6,793,280 | B2 | * | 9/2004 | Washizuka et al. ........... 297/130 |
| 6,921,359 | B2 | | 7/2005 | Haws |
| 6,979,057 | B2 | | 12/2005 | Sedlack |
| 7,090,294 | B2 | | 8/2006 | Balensiefer, II et al. |
| 2003/0015895 | A1 | * | 1/2003 | Hou ........................ 297/130 |
| 2009/0066130 | A1 | | 3/2009 | Shafer et al. |
| 2009/0295207 | A1 | | 12/2009 | Zink et al. |

* cited by examiner

Primary Examiner — Milton Nelson, Jr.
(74) Attorney, Agent, or Firm — Barnes & Thornburg LLP (57) ABSTRACT A child restraint system includes an infant carrier and a base adapted to be mounted on a passenger seat in a vehicle in a vehicle mode. The infant carrier is also configured to be mounted on a stroller frame in a stroller mold. The infant carrier includes a seat shell and a carrying handle coupled to the seat shell.

17 Claims, 8 Drawing Sheets

FIG. 14

CHILD RESTRAINT SYSTEM

PRIORITY CLAIM

This application claims priority under 35 U.S.C. §119(e) to U.S. Provisional Application Ser. No. 61/352,519, filed Jun. 8, 2010, which is expressly incorporated by reference herein.

BACKGROUND

The present disclosure relates to child restraints and, in particular, to an infant carrier that can be mounted on an underlying base held in place on a passenger seat of a vehicle. More particularly, the present disclosure relates to a system for anchoring an infant carrier to an underlying base in one mode and to a stroller frame in another mode.

An infant travel system includes an infant carrier, a base for mounting on a vehicle passenger seat, and a stroller. In a vehicle mode, the infant carrier is mounted on the base after the base is tethered to a passenger seat in a vehicle. In a stroller mode, the infant carrier is mounted on the rolling frame included in the stroller. A carrying handle is included in the infant carrier and coupled to a seat shell included in the infant carrier so that a caregiver can move the seat shell easily between the base and the stroller frame while an infant is at rest in the seat shell.

SUMMARY

A child restraint system in accordance with the present disclosure includes a base adapted to set on a passenger seat in a vehicle and an infant carrier. The infant carrier can be mounted in a stationary position either on the base or on a stroller frame.

In illustrative embodiments, the infant carrier includes a seat shell and a latch plate mounted for movement on the seat shell. The latch plate can be moved relative to the seat shell to assume a shell-retaining position located to engage a latch-blocker arm included in the base to block unauthorized removal of the infant carrier from the base.

The latch plate is formed to include a finger-receiving aperture or space arranged normally to lie under and in alignment with a downwardly extending finger coupled to the latch-blocker arm. During deformation of the seat shell caused by exposure of the seat shell to an external impact force of the type experienced during a sudden vehicle stop, the latch plate can be moved inadvertently by the deforming seat shell relative to the latch-blocker arm included in the base to cause the relatively stationary downwardly extending finger to extend into the finger-receiving aperture or space of the moving latch plate and engage an edge of the latch plate that is arranged to border the finger-receiving aperture. Such engagement blocks movement of the latch plate relative to the seat shell and the latch-blocker arm in the base from the normal shell-retaining position to an unauthorized shell-releasing position so that the seat shell is retained in a mounted position on the base by the engagement of the downwardly extending finger and the latch plate even though the seat shell has been deformed and the latch plate has been moved by the deformed seat shell relative to the latch-blocker arm in the base.

In illustrative embodiments, the seat shell includes a front portion carrying the front shell anchor, an opposite rear portion, and a middle portion arranged to lie between the front and rear portions. The infant carrier also includes a middle shell anchor coupled to the middle portion of the seat shell. The middle shell anchor includes a spring-biased plunger mounted for back-and-forth sliding movement along a plunger-movement line through a channel formed in the middle portion of the seat shell. In a vehicle mode of the infant carrier, the slidable plunger is urged by a spring away from a child-receiving portion of the seat shell into a foundation hole formed in a middle foundation portion of the foundation when the infant carrier is supported in a mounted position on the foundation to help retain the infant carrier in a stationary position on the base.

In illustrative embodiments, the child restraint further includes a rolling stroller frame formed to include a stroller-frame hole defining an anchor holder associated with the middle shell anchor of the infant carrier. In a stroller mode of the infant carrier, the slidable plunger is urged by a spring away from the child-receiving portion of the seat shell into the stroller-frame hole when the infant carrier is supported in a mounted position on the rolling stroller frame to help retain the infant carrier on the rolling stroller frame.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
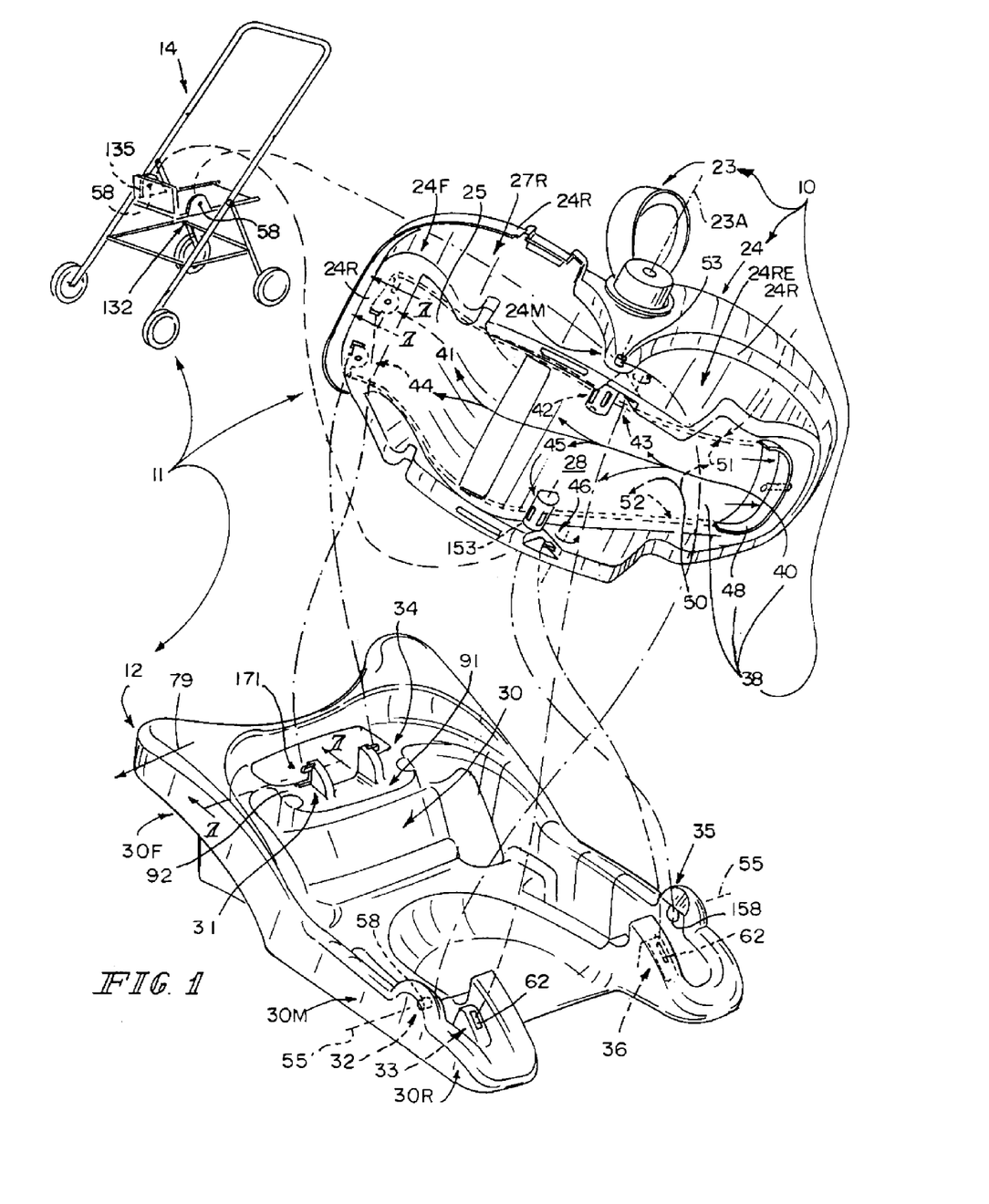
FIG. 1 is a perspective assembly view of a child restraint system in accordance with the present disclosure showing an infant carrier that is configured to include a seat shell and a carrying handle and is adapted to mate with a base in a vehicle mode or with a rolling stroller frame in a stroller mode.

An infant carrier 10 is configured to mate with either a base 12 or a stroller frame 14 as suggested in FIG. 1. Infant carrier 10, base 12, and rolling stroller frame 14 are included in a child restraint 11 as suggested in FIG. 1. In a vehicle mode, infant carrier 10 mounts on a base 12 that is held in place on a passenger seat 16 in a vehicle by a tether 18 coupled using any suitable means to a vehicle body 20 as shown, for example, in FIG. 2. In a stroller mode, infant carrier 10 mounts on stroller frame 14 as shown, for example, in FIG. 3.

Figure 11:
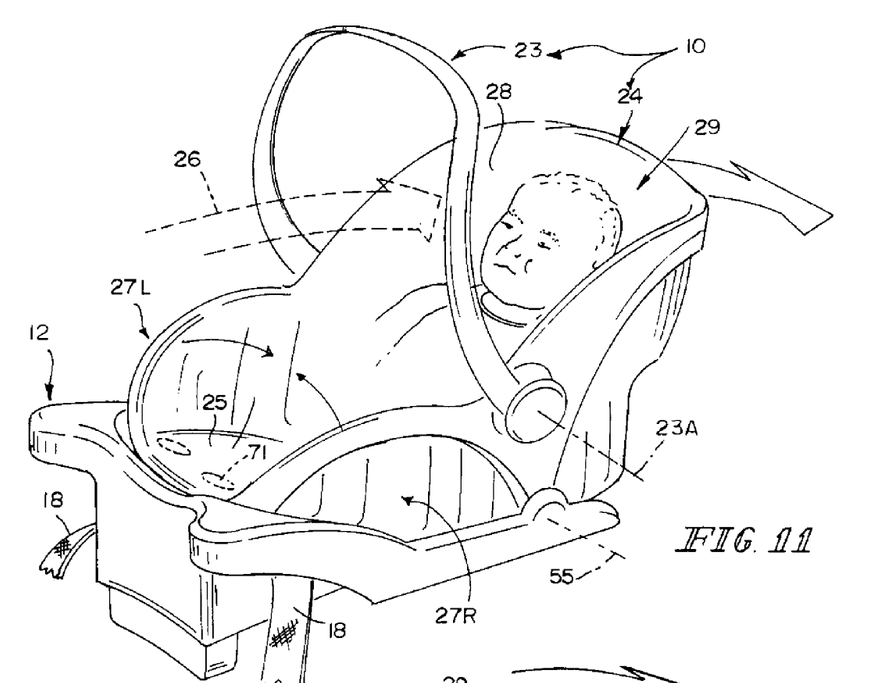
FIG. 11 is a perspective view of the infant carrier in vehicle mode on the base.
Figure 12:
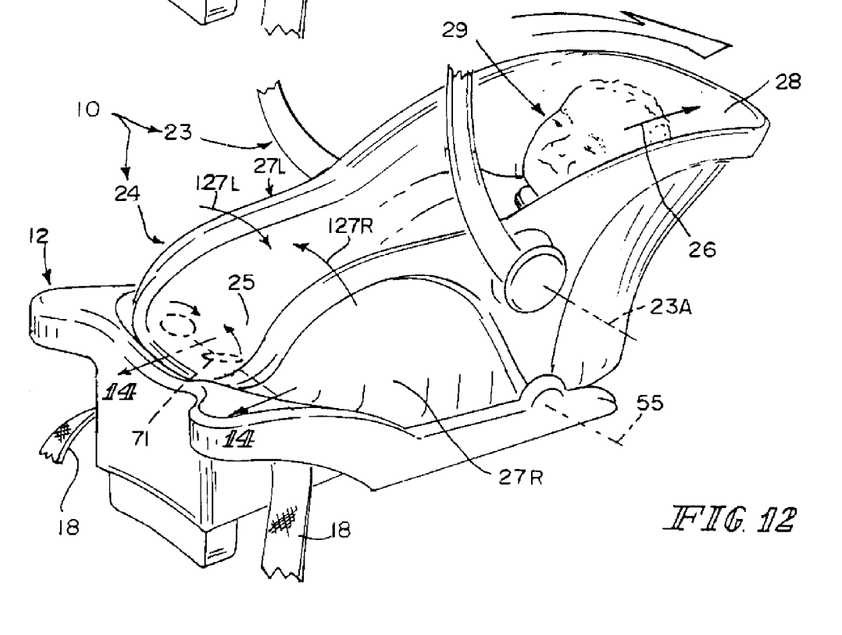
FIG. 12 is similar to FIG. 11 and shows illustrative deformation of the seat shell after exposure of the seat shell to an external impact force during, for example, a sudden vehicle stop.
Figure 13:
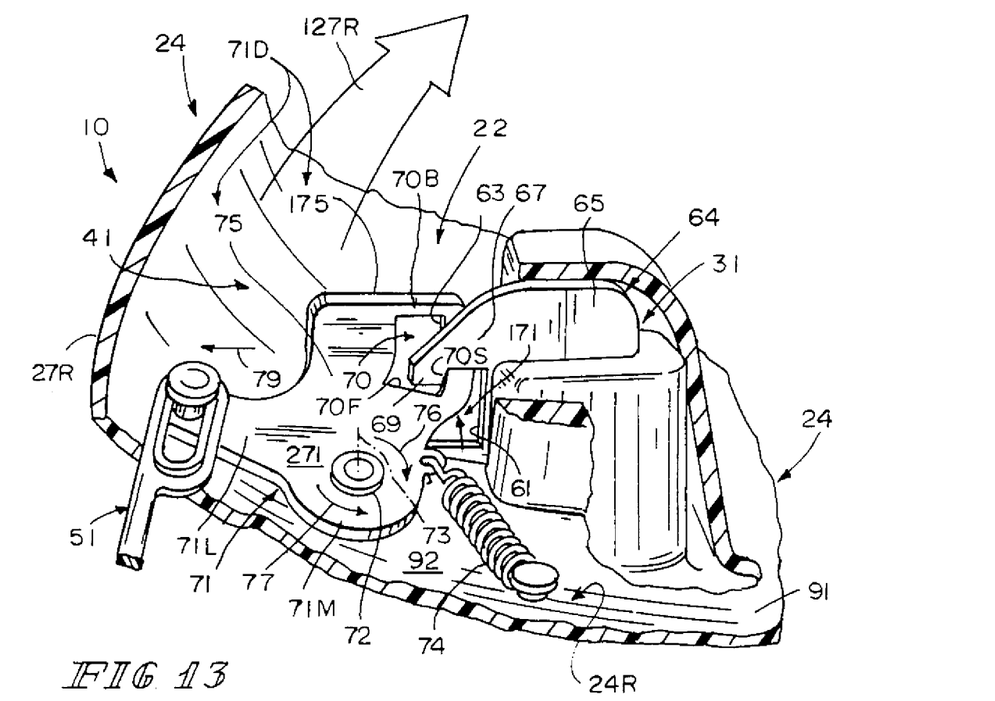
FIG. 13 is an enlarged perspective view of the front shell anchor and the companion front anchor holder during seat shell deformation shown in FIG. 12 showing that a downwardly extending motion-blocking finger appended to the latch-blocker arm is arranged to extend into a finger-receiving aperture formed in the distal portion of the latch plate to block movement of the latch plate away from the latch-blocker arm so as to block disengagement of the front shell anchor and the front shell holder.
Figure 14:
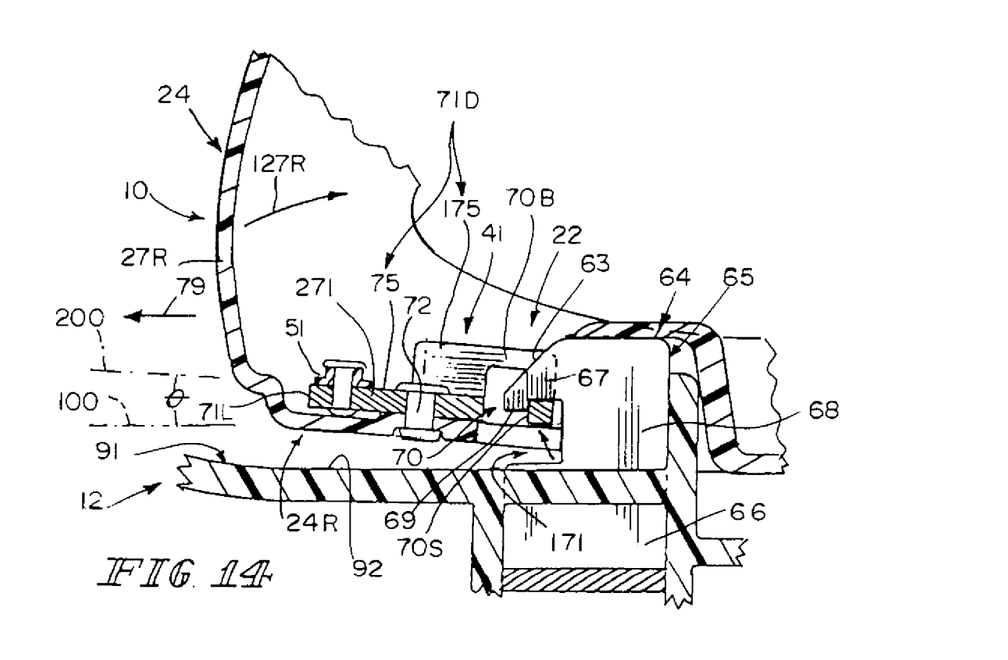
FIG. 14 is an enlarged sectional view taken along line 14-14 of FIG. 12.

An illustrative lock mechanism 22 shown in FIGS. 13 and 14 is configured to block unwanted separation of infant carrier 10 from base 12 in vehicle mode during deformation of a seat shell 24 included in infant carrier 10 caused, for example, by application of an external impact force 26 to seat shell 24 as suggested in FIGS. 11-14. In one illustrative event, external impact force 26 is applied to a shell back 28 included in seat shell 24 and located under an infant 29 carried in seat shell 24 during a sudden vehicle stop as suggested in FIG. 12.

Figures 4A, 4B, 4C:
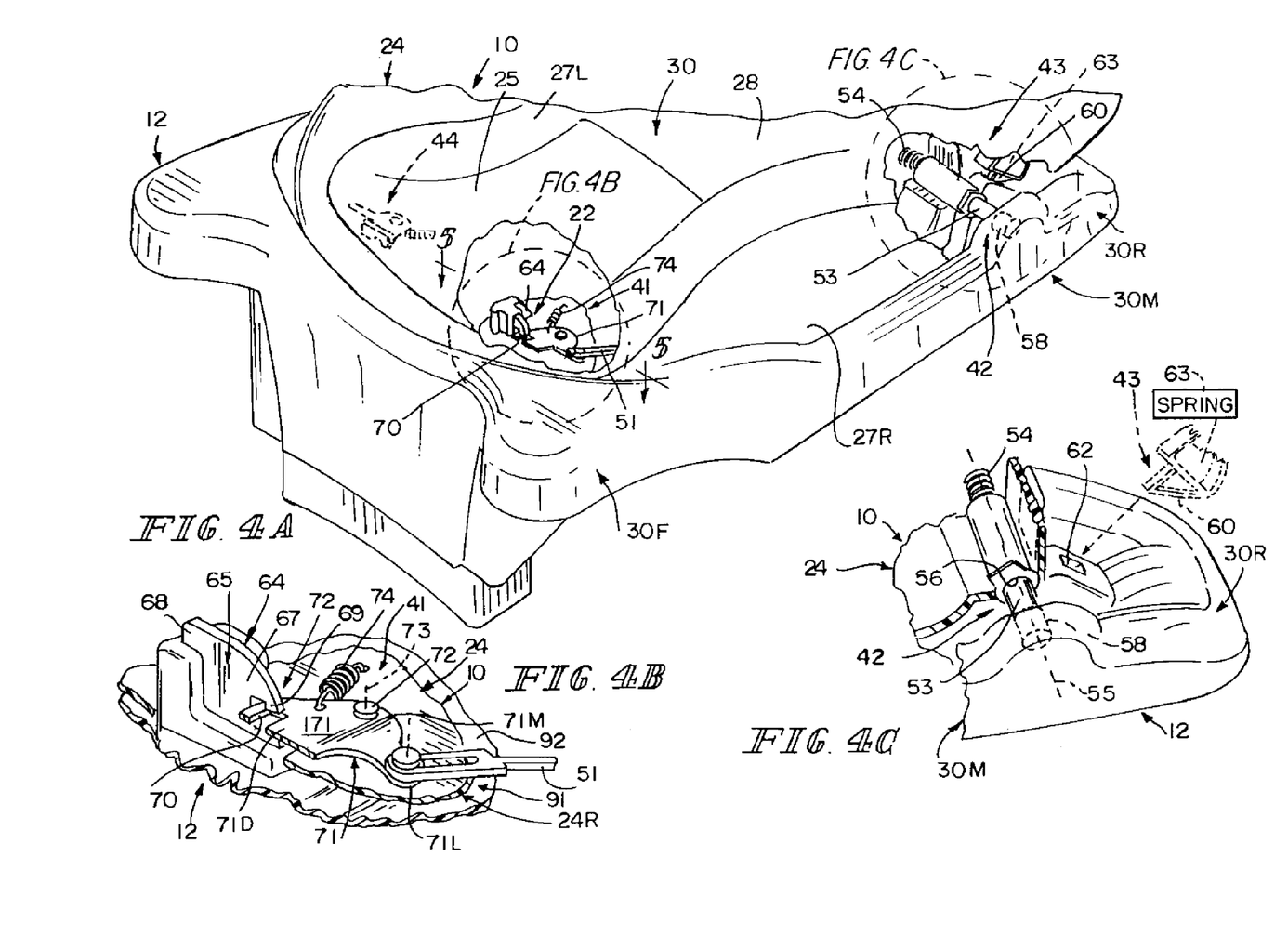
FIG. 4A is an enlarged partial perspective view of the child restraint system shown in FIG. 2 with portions of the seat shell broken away to show illustrative embodiments of three of the six shell anchors included in the infant carrier and mated to the base when the infant carrier is in vehicle mode.
FIG. 4B is an enlarged partial perspective view taken from a first circled section in FIG. 4A showing one of the front shell anchors alongside a front anchor holder included in the base and showing that the front shell anchor includes a spring-biased pivotable latch plate formed to include an aperture arranged to lie under and in alignment with a downwardly extending motion blocking finger included in the front anchor holder and sized to receive a portion of the motion-blocking finger therein during deformation of the seat shell (caused by an external impact to the seat shell) as suggested in FIGS. 13 and 14 to block unwanted motion of the latch plate included in the front shell anchor away from the companion anchor holder included in the base.
FIG. 4C is an enlarged partial perspective view taken from a second circled section in FIG. 4A showing (on the left) a slidable plunger included in one of the middle shell anchors extended into a hole defined by a middle anchor holder included in the base and showing (on the right) a hook included in one of the rear shell anchors and about to be extended into a slot defined by a rear anchor holder included in the base.
Figures 5, 6:
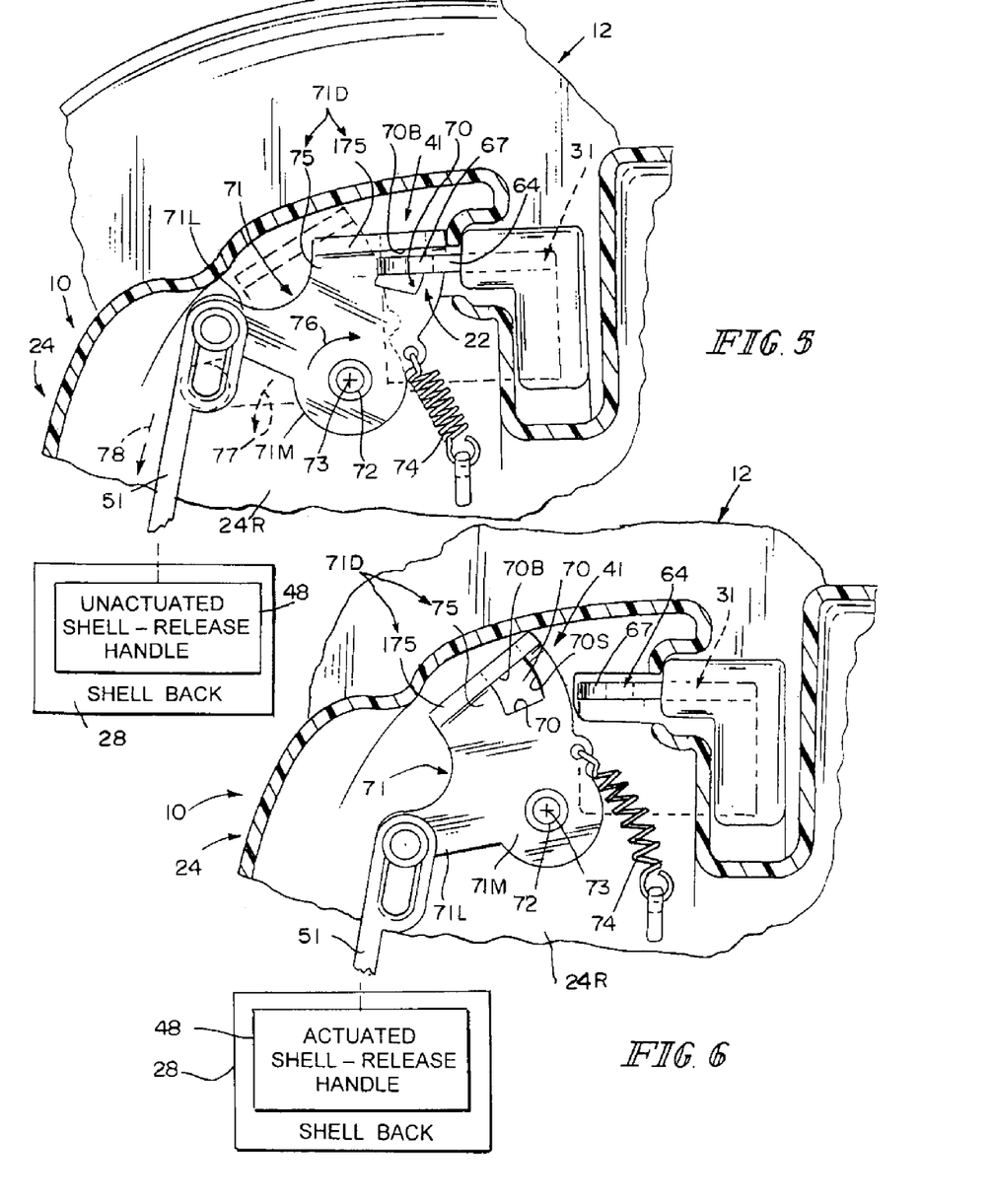
FIG. 5 is a sectional view taken along line 5-5 of FIG. 4A showing that the front shell anchor includes a latch plate mounted on a pivot post and pivoted by a spring to cause a distal portion of the latch plate normally to lie under a latch-blocker arm included in the companion front anchor holder when the seat shell of the infant carrier is mounted on the base and to position the finger-receiving aperture formed in the distal portion of the latch plate to lie under and in alignment with the motion-blocking finger included in the front anchor holder.
FIG. 6 is a sectional view similar to FIG. 5 showing pivoting movement of the latch plate about the pivot post in a counterclockwise direction away from the latch-blocker arm to disengage the front shell anchor from the companion front anchor holder in response to, for example, actuation of a shell-release handle (see also FIG. 1) mounted for movement on an exterior surface of a shell back included in the seat shell.

Lock mechanism 22 includes a pivotable latch plate 71 included in infant carrier 10 and mounted on seat shell 24 to pivot about pivot axis 73 between a shell-retaining position shown in FIG. 5 and a shell-releasing position shown in FIG. 6. Latch plate 71 is formed to include a finger-receiving aperture 70 as suggested in FIGS. 4B, 5 and 6. Lock mechanism 22 also includes a motion-blocking finger 69 included in base 12 and arranged to extend into a finger-receiving aperture 70 and engage a portion of latch plate 71 bordering finger-receiving aperture 70 when latch plate 71 moves relative to base 12 during deformation of seat shell 24 so that latch plate 71 is unable to move relative to base 12 to block unwanted disengagement of infant carrier 10 and base 12 during deformation of seat shell 24 caused by external impact 26 as suggested, for example, in FIGS. 2 and 12-14.

Figure 2:
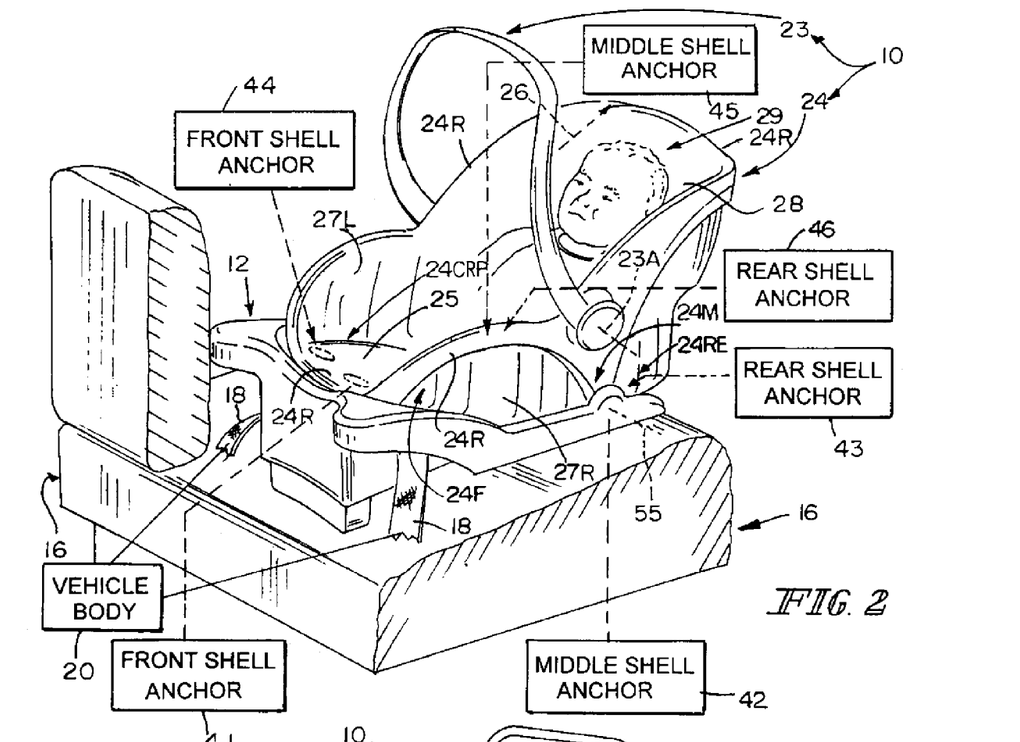
FIG. 2 is a perspective view of the infant carrier in the vehicle mode and showing that the base of FIG. 1 is held in place on a passenger seat in a vehicle by tether straps and showing that six shell anchors are used in an illustrative embodiment to anchor the seat shell of the infant carrier temporarily to the base in the vehicle mode.

Base 12 includes a foundation 30 and six anchor holders 31-36 coupled to foundation 30 as suggested in FIG. 1 and configured to mate with six companion shell anchors 41-46 coupled to seat shell 24 in the vehicle mode as suggested illustratively in FIG. 1 and diagrammatically in FIG. 2. As shown, for example, in FIG. 1, first and second front anchor holders 31, 34 are provided in a front foundation portion 30F of foundation 30, first and second middle anchor holders 32, 35 are provided in a middle foundation portion 30M of foundation 30, and first and second rear anchor holders 33, 36 are provided in a rear foundation portion 30R of foundation 30.

Figure 3:
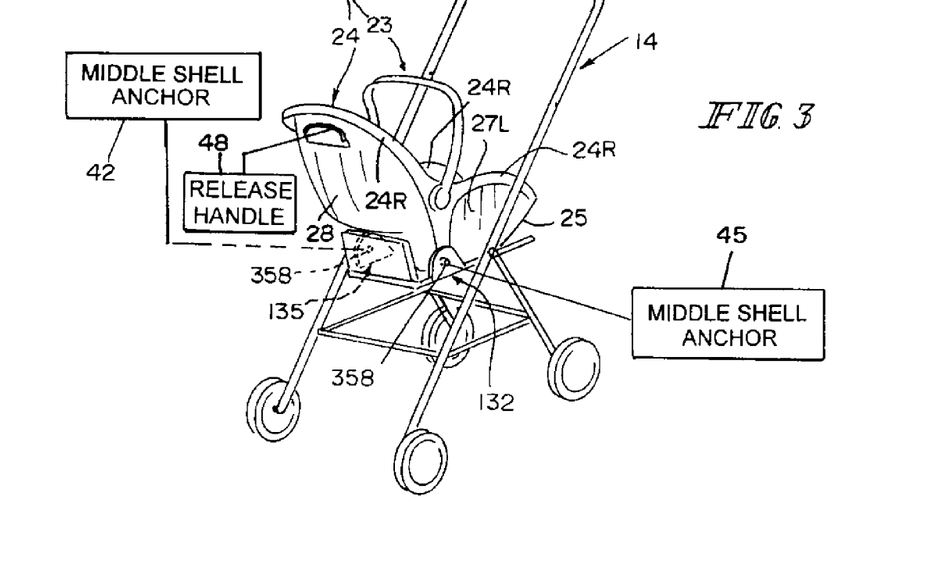
FIG. 3 is a perspective view of the infant carrier in the rolling stroller mode and showing that two middle shell anchors mate with a rolling stroller frame to anchor the seat shell of the infant carrier temporarily to the rolling stroller frame in the stroller mode.

Infant carrier 10 includes a carrying handle 23 coupled to seat shell 24 as shown, for example, in FIGS. 1-3. Seat shell 24 includes a shell bottom 25, an inclined shell back 28 arranged to extend rearwardly and upwardly from shell bottom 25, and left and right side walls 27L, 27R arranged to lie in spaced-apart relation to one another to locate shell bottom 25 and shell back 28 therebetween as suggested in FIGS. 2 and 11. Seat shell 24 also includes a rim 24R arranged to extend in series along outer edges of shell bottom 25, left side wall 27L, shell back 28, and right side wall 27R as suggested in FIGS. 1 and 2. Carrying handle 23 is coupled to left and right side walls 27L, 27R of seat shell 24 in an illustrative embodiment. Latch plate 71 is mounted on a portion of rim 24R arranged to border seat bottom for pivotable movement about pivot axis 73 as shown, for example, in FIGS. 4B, 5, and 6.

Infant carrier 10 further includes base attachment system 38 configured to permit a caregiver to attach seat shell 24 to base 22 in vehicle mode and alternatively to attach seat shell 24 to stroller frame 14 in stroller mode as suggested in FIG. 1. Base attachment system 38 includes an anchor system 40 comprising six shell anchors 41-46, a release handle 48, and a release linkage 50 comprising first and second linkage cords 51, 52 coupled to release handle 48 and to each of the six shell anchors 41-46 as shown, for example, in FIG. 1.

Each of shell anchors 41-46 in infant carrier 10 mates with a companion anchor holder 31-36 in base 12 when infant carrier 10 is mounted on base 12 in vehicle mode to retain infant carrier 10 in a stationary position on base 12 as suggested in FIGS. 1 and 2. Movement of release handle 48 by a caregiver relative to shell back 28 of seat shell 24 causes sufficient movement of first and second linkage cords 51, 52 relative to seat shell 24 to move each of the six shell anchors 41-46 relative to seat shell 24 to disengage the companion anchor holders 31-36 so that infant carrier 10 is free to be removed from base 12 by the caregiver.

In an illustrative embodiment as shown in FIGS. 4A and 4C, first middle shell anchor 42 includes a slidable plunger 53 biased outwardly by a spring 54 away from shell back 28 to move along a plunger-movement line 55 through a channel 56 formed in seat shell 24 into a first blind hole 58 that is formed in middle foundation portion 30M of foundation 30 to define middle anchor holder 32 when infant carrier 10 is mounted on base 12 to help retain infant carrier 10 in a stationary position on base 12 in vehicle mode. First linkage cord 51 is coupled to plunger 53 so that plunger 53 is withdrawn from first blind hole 58 against the biasing force generated by spring 54 in response to actuation of release handle 28 when a caregiver desires to remove infant carrier 10 from base 12. Second middle anchor 45 is coupled to second linkage cord 52 and has a construction similar to first middle anchor 42. Second middle anchor 45 includes a slidable plunger 153 associated with a second blind hole 158 formed in foundation 30 as shown in FIG. 1.

In stroller mode, plunger 53 in first middle shell anchor 42 is biased by spring 54 into a first blind hole 258 defined by a first anchor holder 132 that is formed in stroller frame 14 to help retain infant carrier 10 in a stationary position on stroller frame 14 as suggested in FIGS. 1 and 3. A plunger 153 in second shell anchor 45 is extended into a companion second blind hole 358 defined by a second anchor holder 135 formed in stroller frame 14 to help retain infant carrier 10 in the stationary position on stroller frame 14 as also suggested in FIGS. 1 and 3. Release handle 48 is actuated by a caregiver to withdraw plungers 53, 153 simultaneously from companion blind holes 258, 358, to free infant carrier 10 to be removed from stroller frame 14.

In an illustrative embodiment, as shown in FIGS. 4A and 4C, first rear shell anchor 43 includes a spring-biased hook 60 that extends into a first slot 62 that is formed in rear foundation portion 30R of foundation 30 to define rear anchor holder 33 when infant carrier 10 is mounted on base 12 to help retain infant carrier 10 in a stationary position on base 12 in vehicle mode. First linkage cord 51 is coupled to hook 60 so that hook 60 is withdrawn from first slot 62 in response to actuation of release handle 28 when it is desired to remove infant carrier 10 from base 12. Second rear anchor 46 is coupled to second linkage cord 52 and has a construction similar to first rear anchor 43. Second rear anchor 46 includes a spring-biased hook 160 associated with a second slot 162 formed in rear foundation portion 30R of foundation 30 as shown in FIG. 1

First front anchor holder 31 is coupled to a front foundation portion 30F of foundation 30 as shown, for example, in FIGS. 1 and 4A. First front anchor holder 31 includes an upright blocker support 65 having a lower portion 66 coupled to foundation 30, a laterally extending latch-blocker arm 67 cantilevered to an upper portion 68 of blocker support 65 and formed to include an inclined ramp 63, and a downwardly extending motion-blocking finger 69 cantilevered to a distal portion of latch-blocker arm 67 as shown, for example, FIGS. 7-9. Finger 69, arm 67, and upper and lower portions of blocker support 65 cooperate to form a side-opening channel 171 sized and arranged to receive a distal portion 71D of a latch plate 71 included in front shell anchor 41 when infant carrier 10 is mounted on base 12 and latch plate 71 is urged to assume the shell-retaining position by spring 74 as shown, for example, in FIGS. 4A, 5, 9, 13 and 14. Second front anchor holder 34 is similar in shape and location to first front anchor holder 31 but is a mirror image thereof in an illustrative embodiment.

Front shell anchor 41 includes a latch plate 71 mounted on a pivot post 72 for pivotable movement about a pivot axis 73 relative to seat shell 24 and a spring 74 coupled at one end to latch plate 71 and at another end to seat shell 24 as suggested in FIGS. 4B, 5, 7-9, 13 and 14. Latch plate 71 includes a distal portion 71D, a middle portion 71M coupled to pivot post 72, and a linkage portion 71L coupled to first linkage cord 51 as shown, for example, in FIGS. 4B and 13. Distal portion 71D includes a bar 75 formed to include a finger-receiving aperture 70 and an upright flange 175 appended to latch 75 as suggested in FIGS. 5, 6, and 13. As suggested in FIG. 6, edges 70F, 70S, and 70B in latch plate 71 border finger-receiving aperture 70. Front edge 70F is included in latch 75. Side edge 70S is included in bar 75. Back edge 70B is included in upright flange 175.

As suggested in FIGS. 4A, 4B, 5 and 9, latch plate 71 is pivoted about pivot axis 73 by spring 74 in clockwise direction 76 (1) to cause bar 75 of distal portion 71D of latch plate 71 normally to lie under latch-blocker arm 67 in the companion front anchor holder 31 to establish the shell-retaining position when seat shell 24 of infant carrier 10 is mounted on base 12 so that any removal of infant carrier 10 from base 12 will be blocked by engagement of bar 75 of latch plate 71 and latch-blocker arm 75 and (2) to position finger-receiving aperture 70 formed in bar 75 of distal portion 71D of latch plate 71 to lie under and in alignment with the downwardly extending motion-blocking finger 69 included in the companion front anchor holder 31. Movement of release handle 48 along shell back 28 can move first linkage cord 51 in direction 78 to cause latch plate 71 to pivot about pivot axis 73 in counterclockwise direction 77 away from latch-blocker arm 67 to assume the shell-releasing position and disengage front shell anchor 41 from the companion front shell anchor holder 31 by moving latch plate 71 away from latch-blocker arm 67 as suggested in FIGS. 5 and 6.

An upright flange 175 is included in distal portion 71D and of latch plate 71 and is appended to an outer edge of bar 75 also included in distal portion 71D of latch plate 71. Upright flange 175 includes a back edge 70B that is arranged to extend along finger-receiving aperture 70 and locate aperture 70 in a space provided between upright flange 175 and pivot post 72 (and pivot axis 73) as shown, for example, in FIGS. 5 and 6.

Figure 7:
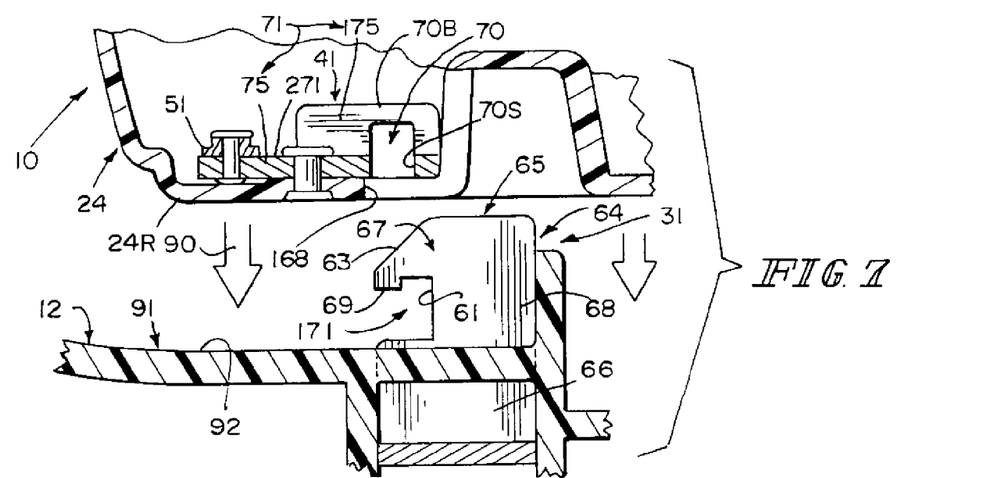
FIGS. 7-9 are a series of sectional views taken along line 7-7 of FIG. 1 showing an illustrative manner in which the front shell anchor in the infant carrier is engaged to the companion front anchor holder in the base when the infant carrier is mounted on the underlying base.
Figure 8:
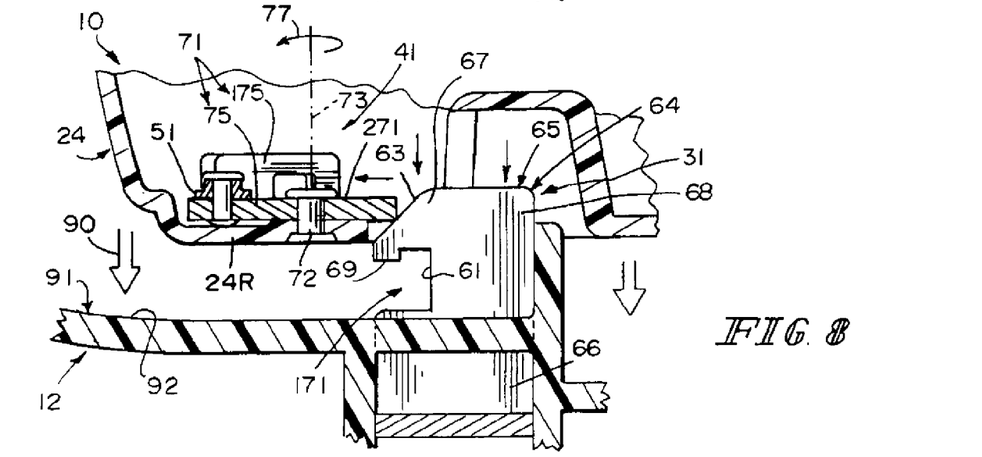
Figure 9:
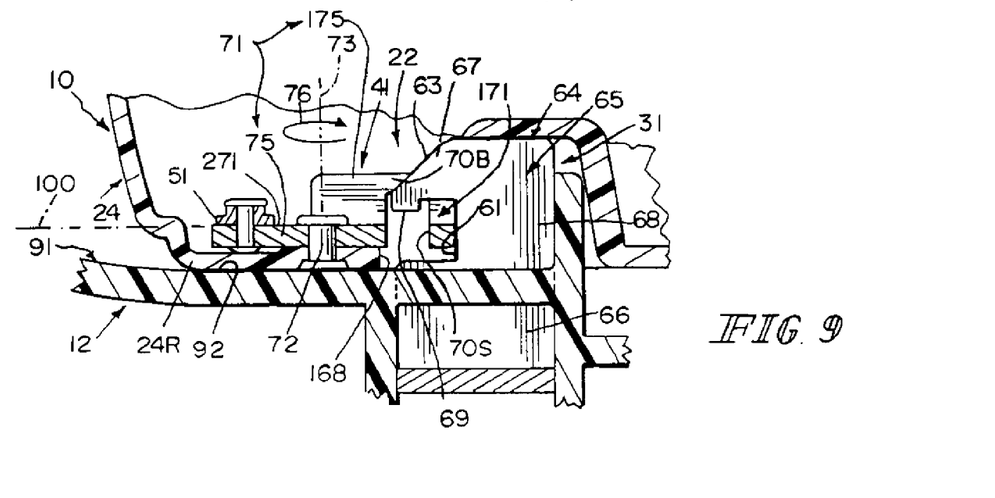

An illustrative manner of engaging the first front shell anchor 41 to the first front anchor holder 31 is shown in sequence in FIGS. 7-9. Upper portion 68 of blocker support 65 passes through an opening 168 formed in rim 24R of seat shell 24 and bar 75 of latch plate 71 engages the inclined ramp 63 formed on latch-blocker arm 67 in first front anchor holder 31 during downward movement of infant carrier 10 toward base 12 in direction 90 to cause latch plate 71 to pivot about pivot axis 73 in counterclockwise direction 77 to allow bar 75 of latch plate 71 to pass latch-blocker arm 67 and motion-blocking finger 69. Then spring 74 applies a torque to latch plate 71 to cause latch plate 71 to pivot about pivot axis 73 in clockwise direction 76 to cause the bar 75 of distal portion 71D of latch plate 71 to extend into a bar-receiving side-opening channel 171 formed in first front anchor holder 31, pass under motion-blocking finger 69 and latch-blocker arm 67, and abut an inner edge 61 of upper portion 68 of blocker support 65 to assume the shell-retaining position and to locate the finger-receiving aperture 70 formed in bar 75 of latch plate 71 under and in alignment with downwardly extending motion-blocking finger 69 as shown, for example, in FIGS. 4A, 4B, 5, and 9.

When seat shell 24 is moved by a caregiver to assume a mounted position on a top surface 91 of foundation 30, a portion of rim 24R of seat shell 24 engages an underlying shell-support pad 92 included in top surface 91 of foundation 30 in base 12 as suggested in FIGS. 1, 4B, and 7-9. Such engagement occurs, for example, while a top face 271 of latch plate 71 lies in generally horizontal plane 100 as suggested in FIG. 9. As suggested in FIG. 14, engagement of rim 24R in seat shell 24 and underlying shell-support pad 92 included in top surface 91 of foundation 30 in base 12 can be broken during deformation of seat shell 24 of the type shown in FIGS. 12 and 13.

As suggested in FIGS. 11 and 12, during exposure of infant carrier 10 and base 12 to a sudden vehicle stop in vehicle mode, an external impact force 26 may be applied to shell back 28 in seat shell 24 by movement of the infant 29 relative to seat shell 24 to cause seat shell 24 to deform. Such deformation may be characterized by movement of right and left side walls 27R, 27C of seat shell 24 toward one another as suggested in FIGS. 12-14.

Movement of right side wall 27R in inward direction 127R (as left side wall 27L moves in inward direction 127L) may cause latch plate 71 to move from a normal generally horizontal plane 100 through an acute angle θ to lie in an inclined plane 200 as suggested in FIGS. 9 and 14. This motion of latch plate 71 toward inclined plane 200 causes latch plate 71 to change orientation and move toward motion-blocking finger 69 to cause the relatively stationary motion-blocking finger 69 to extend downwardly into finger-receiving aperture 70 formed in bar 75 of distal portion 71D of latch plate 71 as a result of movement of latch plate 71 relative to motion-blocking finger 69 as suggested in FIGS. 13 and 14.

Once motion-blocking finger 69 is extended into finger-receiving aperture 70 (or a finger-receiving space of any suitable kind provided on or in latch plate 71) in response to, for example, deformation of seat shell 24, finger 69 is positioned relative to latch plate 71 to engage one or more of, for example, edges 70S, 70F, and 70B included in latch plate 71 to block motion of latch plate 71 from a shell-retaining position as suggested in FIG. 13 to any shell-releasing position away from latch-blocker arm 67 of first front anchor holder 31. Upright flange 175 of latch plate 71 also functions to provide means for engaging a portion of right side wall 27R as suggested in FIG. 13 during movement of right side wall 27R in inward direction 127F accompanying deformation of seat shell 24 to limit further movement of right side wall 27R relative to shell-support pad 92 so that any change in the orientation of latch plate 71 relative to underlying shell-support pad 92 in base 12 is minimized during a sudden vehicle stop.

Engagement of relatively stationary motion-blocking finger 69 and side edge 70S in latch plate 71 during a sudden vehicle stop is shown, for example, in FIGS. 13 and 14. As a result of motion of latch plate 71 relative to underlying shell-support pad 92 in base 12, motion-blocking finger 69 engages a side edge 70S in bar 75 of latch plate 71 bordering aperture 70 to provide means for blocking sliding movement of latch plate 71 in a direction 79 (see FIGS. 1, 13, and 14) away from first and second front anchor holders 31, 34 so that first front shell anchor 41 is not disengaged from the companion first front anchor holder 31 during deformation of right side wall 27R caused by exposure of seat shell 24 to an external impact force 26. Such engagement of pivot-blocking finger 69 and side edge 70S of latch plate 71 bordering aperture 70 while finger 69 extends into finger-receiving aperture 70 helps to block unwanted separation of infant carrier 10 from base 12 during sudden vehicle stops.

Motion-blocking finger 69, once extended into finger-receiving aperture 70, can also engage a front edge 70F in latch plate 71 during a sudden vehicle stop. Such engagement causes the relatively stationary motion-blocking finger 69 to provide means for blocking counterclockwise pivoting movement of latch plate 71 about pivot axis 73 in counterclockwise direction 77 as suggested in FIGS. 13 and 14 so that first front shell anchor 41 is not disengaged from the companion first front anchor holder 31 during deformation of right side wall 27R caused by exposure of seat shell 24 to an external impact force 26.

Motion-blocking finger 69, once extended into finger-receiving aperture 70 (or at least in close proximity to aperture 70), can also engage a back edge 70B of latch plate 71 during a sudden vehicle stop. Back edge 70B is established in upright flange 175 in an illustrative embodiment. Such engagement causes the relatively stationary motion-blocking finger 69 to provide means for blocking clockwise pivoting movement of latch plate 71 about pivot axis 73 in clockwise direction 76 as suggested in FIGS. 13 and 14 so that front shell anchor 41 is not disengaged from the companion first front anchor holder 31 during deformation of right side wall 27R caused by exposure of seat shell 24 to an external impact force 26.

A child restraint system 11 includes an infant carrier 10, a base 12 for supporting infant carrier 10 in a vehicle mode, and a rolling stroller frame 14 for supporting infant carrier 10 in a stroller mode as suggested in FIG. 1. The vehicle mode of infant carrier 10 is shown, for example, in FIG. 2. The stroller mode of infant carrier 10 is shown, for example in FIG. 3.

Infant carrier 10 includes a seat shell 24 having a front portion 24F, an opposite rear portion 24RE, and a middle portion 24M arranged to lie between front 24F and rear portions 24RE as suggested in FIGS. 1 and 2. Infant carrier 10 further including a child-receiving portion 24CRP arranged to extend between front and rear portions 24F, 24RE and adapted to support a child 29 in infant carrier 10 and a middle shell anchor 42 coupled to middle portion 24M of seat shell 24 as suggested in FIG. 2.

Base 12 includes a foundation 30 adapted to set on a passenger seat 16 in a vehicle 20 and to support infant carrier 10 in a mounted position on base 12 as suggested in FIG. 2. Foundation 30 is formed to include a foundation hole 58 defining a middle anchor holder 32 associated with middle shell anchor 42 of infant carrier 10. Middle shell anchor 42 includes a slidable plunger 53 and a spring 54 as suggested in FIGS. 4A and 4C. Slidable plunger 53 is mounted for back-and-forth sliding movement along a plunger-movement line 55 through a channel 56 formed in middle portion 24M of seat shell 24. Spring 54 is arranged to urge slidable plunger 53 away from child-receiving portion 24CRP of seat shell 24 along plunger-movement line 55 through channel 56 into foundation hole 58 formed in foundation 30 when infant carrier 10 is supported in the mounted position on foundation 30 to help retain infant carrier 10 in a stationary position on base 12 in a vehicle mode for infant carrier 10.

Rolling stroller frame 14 is separated from base 12 and adapted to support infant carrier 10 in a mounted position on rolling stroller frame 14 and to roll along the ground underlying infant carrier 10 as suggested in FIG. 3. Rolling stroller frame 14 is formed to include a stroller-frame hole 358 defining an anchor holder 32 associated with middle shell anchor 42 of infant carrier 10 as suggested in FIG. 3. Spring 54 is arranged to urge slidable plunger 53 away from child-receiving portion 24CRP of seat shell 24 along plunger-movement line 55 through channel 56 into stroller-frame hole 358 formed in rolling stroller frame 14 when infant carrier 10 is supported in the mounted position on rolling stroller frame 14 to help retain infant carrier 10 on rolling stroller frame 14 in a stroller mode of infant carrier 10 as suggested in FIG. 3.

Figure 10:
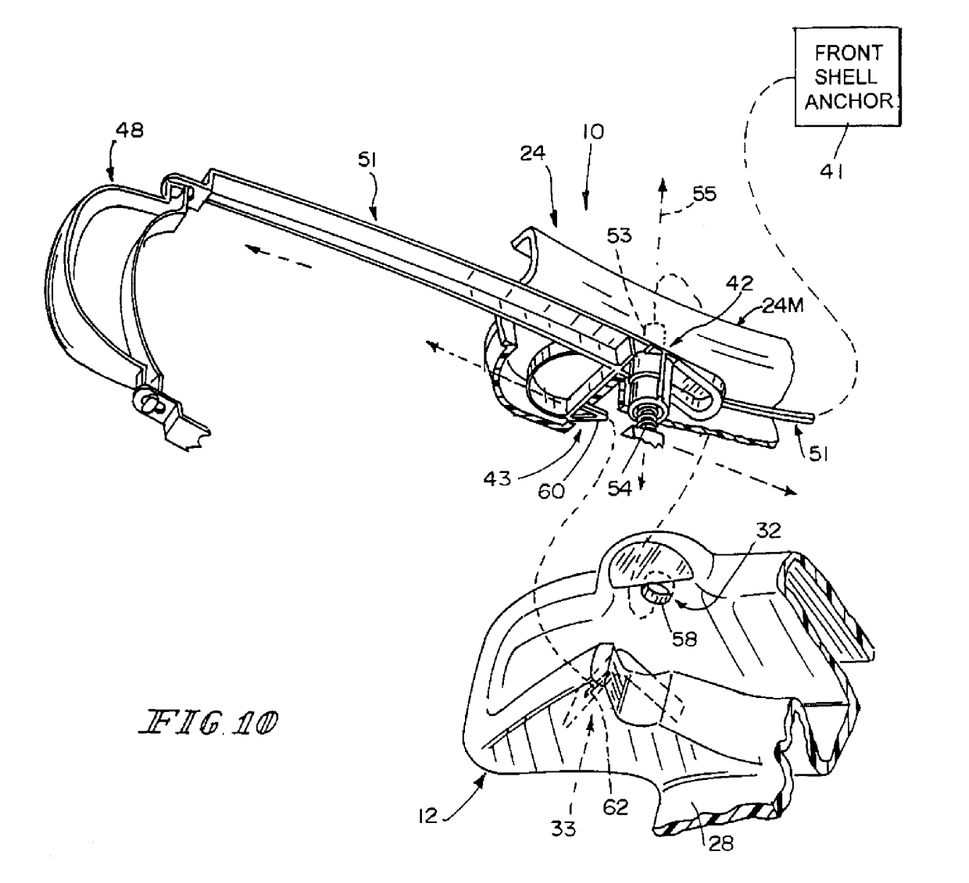
FIG. 10 is an enlarged exploded perspective assembly view showing components that cooperate to form the middle and rear shell anchors included in the infant carrier and showing companion middle and rear anchor holders included in the base.

Infant carrier 10 further includes a release handle 48 mounted for movement relative to seat shell 24 and a linkage cord 51 coupled to release handle 48 and to slidable plunger 53 as suggested in FIGS. 1 and 10. Linkage cord 51 is arranged to withdraw slidable plunger 53 from foundation hole 58 when infant carrier is in the vehicle mode and from stroller-frame hole 358 when infant carrier 10 is in the stroller mode in response to movement of release handle 48 relative to seat shell 24 against a biasing force generated by spring 54 normally to urge slidable plunger 53 to move away from child-receiving portion 24CRP of seat shell 24 to an actuated position to free infant carrier 10 to be removed from base 12 in the vehicle mode and rolling stroller frame 14 in the stroller mode.

Foundation 30 further includes a middle foundation portion 30M formed to include foundation hole 58 defining middle anchor holder 32, front foundation portion 30F, and an opposite rear foundation portion 30R arranged to lie in spaced-apart relation to front foundation portion 30F to locate middle foundation portion 30M there between as suggested in FIG. 1. Infant carrier 10 further includes a front shell anchor 41 is coupled to front portion 24F of seat shell 24 and configured to mate with a companion front anchor holder 31 formed in front foundation portion 30F to anchor infant carrier 10 to the front foundation portion 30F when infant carrier 10 is in the vehicle mode. Rear shell anchor 43 is coupled to rear portion 24RE of seat shell 24 and configured to mate with a companion rear anchor holder 33 formed in rear foundation portion 30R to anchor infant carrier 10 to rear foundation portion 30R when infant carrier 10 is in the vehicle mode.

In illustrative embodiments the rear shell anchor 43 includes a spring-biased hook 60 that extends into a slot 62 formed in rear foundation portion 30R to define rear anchor holder 33 in response to a biasing force generated by a spring 63 coupled to rear foundation portion 30R and to spring-biased hook 60 when infant carrier 10 is supported in the mounted position on base 12. Hook 60 and spring 63 cooperate to provide hook means for retaining infant carrier 10 in a stationary position on base in 12 the vehicle mode. Linkage cord 51 is also coupled to spring-biased hook 60 and arranged to withdraw spring-biased hook 60 from slot 62 formed in rear foundation portion 30R in response to movement of release handle 42 relative to seat shell 24 to the actuated position when it is desired to remove infant carrier 10 from base 12.

Infant carrier 10 further includes a carrying handle 23 mounted on seat 24 shell for pivotable movement about a handle-pivot axis 23A arranged to extend through the middle portion 24M of seat shell 24. Plunger-movement line 55 is arranged to lie in spaced-apart parallel relation to handle-pivot axis 23A as suggested in FIGS. 2, 11, and 12.

The invention claimed is:

1. A child restraint system comprising an infant carrier including a seat shell and a front shell anchor coupled to the seat shell and configured to include a latch plate mounted on a rim included in the seat shell for pivotable movement about a pivot axis relative to the seat shell between a shell-retaining position and a shell-releasing position and a base including a foundation adapted to set on a passenger seat in a vehicle and a front anchor holder coupled to the foundation and arranged to overlie a distal portion of the latch plate to block removal of the seat shell from a mounted position on a top surface of the foundation upon pivoting movement of the latch plate to assume the shell-retaining position while the seat shell occupies the mounted position and the rim of the seat shell engages an underlying shell-support pad included in the top surface of the foundation, wherein the latch plate is formed to include a finger-receiving aperture, the front anchor holder includes a blocker support arranged to extend upwardly from the shell-support pad included in the top surface of the foundation through an opening formed in the rim of the seat shell when the seat shell occupies the mounted position on the top surface of the foundation and a latch-blocker arm cantilevered to the blocker support and arranged to lie in spaced-apart relation to the shell-support pad of the foundation to locate the distal portion of the latch plate therebetween when the seat shell is in the mounted position and the latch plate is in the shell-retaining position, and the front anchor holder further includes a motion-blocking finger coupled to the latch-blocker arm and configured to extend downwardly into the finger-receiving aperture during disengagement of the rim of the seat shell from the shell-support pad in response to deformation of the seat shell when the seat shell is in the mounted position to cause the motion-blocking finger to provide lock means for engaging the latch plate to block movement of the latch plate relative to the front anchor holder from the shell-retaining position to the shell-releasing position so that the seat shell is retained in the mounted position.

2. The child restraint system of claim 1, wherein the blocker support is arranged to extend upwardly away from the shell-support pad, the latch-blocker arm is arranged to extend laterally away from the blocker support to overlie the latch plate when the latch plate occupies the shell-retaining position, and the motion-blocking finger is arranged to extend downwardly from the latch-blocker arm in a direction toward the shell-support pad.

3. The child restraint-system of claim 1, further comprising an upright flange appended to the distal portion of the latch plate and arranged to extend along the finger-receiving aperture to locate the finger-receiving aperture in a space provided between the upright flange and the pivot axis and to provide means for engaging a portion of the seat shell during deformation of the seat shell to minimize any change in the orientation of the latch plate relative to the underlying shell-support pad during deformation of the seat shell.

4. The child restraint system of claim 1, wherein the latch plate includes an edge bordering the finger-receiving aperture and the motion-blocking finger engages the edge during movement of the rim of the seat shell away from the underlying shell-support pad and toward the motion-blocking finger to block pivoting movement of the latch plate away from the shell-retaining position.

5. The child restraint system of claim 4, wherein the front shell anchor further includes a spring coupled to the latch plate and to the seat shell and configured to provide means for causing the latch plate to pivot in a clockwise direction about the pivot axis normally to move from the shell-releasing position to the shell-retaining position and the motion-blocking finger is arranged to engage a front edge in the latch plate bordering the finger-receiving aperture to provide means for blocking counterclockwise pivoting movement of the latch plate about the pivot axis in an opposite counterclockwise direction from the shell-retaining position to the shell-releasing position.

6. The child restraint system of claim 4, wherein the blocker support is arranged to extend upwardly away from the shell-support pad, the latch-blocker arm is arranged to extend laterally away from the blocker support to overlie the latch plate when the latch plate occupies the shell-retaining position, and the motion-blocking finger is arranged to extend downwardly from the latch-blocker arm in a direction toward the shell-support pad.

7. The child restraint system of claim 4, wherein the motion-blocking finger is arranged to engage a side edge in the latch plate bordering the finger-receiving aperture to provide means for blocking sliding movement of the latch plate away from the blocker support from a shell-retaining position to a shell-releasing position and the side edge is arranged to lie between the motion-blocking finger and a portion of the blocker support when the motion-blocking finger is arranged to extend into the finger-receiving aperture.

8. The child restraint-system of claim 4, further comprising an upright flange appended to the distal portion of the latch plate and arranged to extend along the finger-receiving aperture to locate the finger-receiving aperture in a space provided between the upright flange and the pivot axis and to provide means for engaging a portion of the seat shell during deformation of the seat shell to minimize any change in the orientation of the latch plate relative 9. The child restraint system of claim 4, wherein the motion-blocking finger is arranged to engage a back edge in the latch plate to provide means for blocking pivoting movement of the latch plate about the pivot axis from the shell-retaining position to the shell-releasing position.

10. The child restraint system of claim 9, wherein the latch plate includes a bar formed to include the finger-receiving aperture and an upright flange appended to the bar to locate the finger-receiving aperture between the upright flange and the pivot post and configured to include the back edge. to the underlying shell-support pad during deformation of the seat shell.

11. A child restraint system comprising
an infant carrier including a seat shell having a front portion, an opposite rear portion, and a middle portion arranged to lie between the front and rear portions, the infant carrier further including a child-receiving portion arranged to extend between the front and rear portions and adapted to support a child in the infant carrier and a middle shell anchor coupled to the middle portion of the seat shell,
a base including a foundation adapted to set on a passenger seat in a vehicle and to support the infant carrier in a mounted position on the base, wherein the foundation is formed to include a foundation hole defining a middle anchor holder associated with the middle shell anchor of the infant carrier, the middle shell anchor includes a slidable plunger mounted for back-and-forth sliding movement along a plunger-movement line through a channel formed in the middle portion of the seat shell and a spring arranged to urge the slidable plunger away from the child-receiving portion of the seat shell along the plunger-movement line through the channel into the foundation hole formed in the foundation when the infant carrier is supported in the mounted position on the foundation to help retain the infant carrier in a stationary position on the base in a vehicle mode for the infant carrier.

12. The child restraint-system of claim 11, wherein the infant carrier further includes a carrying handle mounted on the seat shell for pivotable movement about a handle-pivot axis arranged to extend through the middle portion of the infant carrier and the plunger-movement line is arranged to lie in spaced-apart parallel relation to the handle-pivot axis.

13. The child restraint system of claim 11, further comprising a rolling stroller frame separated from the base and adapted to support the infant carrier in a mounted position on the rolling stroller frame and to roll along the ground underlying the infant carrier, wherein the rolling stroller frame is formed to include a stroller-frame hole defining an anchor holder associated with the middle shell anchor of the infant carrier and the spring is arranged to urge the slidable plunger away from the child-receiving portion of the seat shell along the plunger-movement line through the channel into the stroller-frame hole formed in the rolling stroller frame when the infant carrier is supported in the mounted position on the rolling stroller frame to help retain the infant carrier on the rolling stroller frame in a stroller mode of the infant carrier.

14. The child restraint system of claim 13, wherein the infant carrier further includes a release handle mounted for movement relative to the seat shell and a linkage cord coupled to the release handle and to the slidable plunger and arranged to withdraw the slidable plunger from the foundation hole when the infant carrier is in the vehicle mode and from the stroller-frame hole when the infant carrier is in the stroller mode in response to movement of the release handle relative to the seat shell against a biasing force generated by the spring normally to urge the slidable plunger to move away from the child-receiving portion of the seat shell to an actuated position to free the infant carrier to be removed from the base in the vehicle mode and the rolling stroller frame in the stroller mode.

15. The child restraint-system of claim 11, wherein the foundation further includes a middle foundation portion formed to include the foundation hole defining the middle anchor holder, front foundation portion, and an opposite rear foundation portion arranged to lie in spaced-apart relation to the front foundation portion to locate the middle foundation portion therebetween, and the infant carrier further includes a front shell anchor coupled to the front portion of the seat shell and configured to mate with a companion front anchor holder formed in the front foundation portion to anchor the infant carrier to the front foundation portion when the infant carrier is in the vehicle mode and a rear shell anchor coupled to the rear portion of the seat shell and configured to mate with a companion rear anchor holder formed in the rear foundation portion to anchor the infant carrier to the rear foundation portion when the infant carrier is in the vehicle mode.

16. The child restraint-system of claim 15, wherein the rear shell anchor includes a spring-biased hook that extends into a slot formed in the rear foundation portion to define the rear anchor holder in response to a biasing force generated by a spring coupled to the rear foundation portion and to the spring-biased hook when the infant carrier is supported in the mounted position on the base to provide hook means for retaining the infant carrier in a stationary position on the base in the vehicle mode.

17. The child restraint-system of claim 16, wherein the infant carrier further includes a release handle mounted for movement relative to the seat shell and a linkage cord coupled to the release handle and to the slidable plunger and arranged to withdraw the slidable plunger from the foundation hole when the infant carrier is supported in the mounted position on the foundation in response to movement of the release handle relative to the seat shell against a biasing force generated by the spring normally to urge the slidable plunger to move away from the child-receiving portion of the seat shell to an actuated position to free the infant carrier to be removed from the base, and the linkage cord is also coupled to the spring-biased hook and arranged to withdraw the spring-biased hook from the slot formed in the rear foundation portion in response to movement of the release handle relative to the seat shell to the actuated position when it is desired to remove the infant carrier from the base.

* * * * *